United States Patent
Covington et al.

(10) Patent No.: US 7,178,454 B2
(45) Date of Patent: Feb. 20, 2007

(54) COMPACTOR APPARATUS INCLUDING SINGLE CYLINDERS AND GUIDE MEMBERS ON THE SIDES OF AN ON-BOARD MODULE BUILDER OF A COTTON HARVESTING MACHINE

(75) Inventors: Michael J. Covington, Bettendorf, IA (US); Timothy A. Meeks, Davenport, IA (US); Gary R. Gallens, Geneseo, IL (US); George H. Hale, Arlington, TN (US)

(73) Assignee: CNH America LLC, New Holland, PA (US)

( * ) Notice: Subject to any disclaimer, the term of this patent is extended or adjusted under 35 U.S.C. 154(b) by 193 days.

(21) Appl. No.: 11/089,697

(22) Filed: Mar. 25, 2005

(65) Prior Publication Data

US 2005/0217507 A1  Oct. 6, 2005

Related U.S. Application Data

(60) Provisional application No. 60/557,887, filed on Mar. 30, 2004.

(51) Int. Cl.
   *B30B 1/00* (2006.01)
   *A01D 46/08* (2006.01)
(52) U.S. Cl. .................. 100/226; 100/177; 100/229 A; 100/245; 56/28
(58) Field of Classification Search ............... 100/100, 100/145, 177, 178, 179, 210, 214, 226, 229 A, 100/245, 269.13, 269.17; 56/28, 30, 16.4 B, 56/341, 432; 460/119
See application file for complete search history.

(56) References Cited

U.S. PATENT DOCUMENTS

| | | | |
|---|---|---|---|
| 1,645,906 A * | 1/1927 | Hansen | 100/226 |
| 3,937,140 A | 2/1976 | Swanson | 100/245 |
| 4,127,061 A | 11/1978 | Husky | 100/100 |
| 5,056,428 A | 10/1991 | Allen | 100/200 |
| 5,584,762 A * | 12/1996 | Buhler et al. | 460/119 |
| 5,601,017 A | 2/1997 | Schoen | 100/258 R |
| 5,642,662 A | 7/1997 | Schwelling | 100/245 |
| 5,799,573 A | 9/1998 | Levy | 100/271 |
| 6,530,199 B1 | 3/2003 | Covington et al. | 56/16.6 |
| 6,536,197 B1 | 3/2003 | Covington et al. | 56/28 |
| 2003/0217652 A1 | 11/2003 | Hisanoubu et al. | 100/269.17 |

* cited by examiner

*Primary Examiner*—Lowell A. Larson
*Assistant Examiner*—Jimmy Nguyen
(74) *Attorney, Agent, or Firm*—Michael G. Harms; John William Stader; Stephen A. Bucchianori

(57) ABSTRACT

Compactor apparatus for an on-board module builder, including single cylinders and guide members on opposite sides of the module builder for guiding and effecting a cotton compacting process. The compactor apparatus includes a frame disposed in a cotton module builder chamber, movable downwardly within the chamber against the cotton for compacting the cotton against the floor and walls of the chamber. The frame includes cross members which extend across the chamber and protrude outwardly therefrom through upwardly and downwardly extending slots or passages through the sides of the module builder. The ends on each side are connected together by an exterior side structure which is movable upwardly and downwardly by a suitable driver, guided by at least one vertically extending guide member.

17 Claims, 7 Drawing Sheets

COMPACTOR APPARATUS INCLUDING SINGLE CYLINDERS AND GUIDE MEMBERS ON THE SIDES OF AN ON-BOARD MODULE BUILDER OF A COTTON HARVESTING MACHINE

This application claims the benefit of U.S. Provisional Application No. 60/557,887, filed Mar. 30, 2004.

TECHNICAL FIELD

This invention relates generally to cotton harvesting machines having an on-board cotton module builder, and more particularly, to a compactor apparatus for an on-board module builder which includes single cylinders and guide members on opposite sides of the module builder for guiding and effecting a cotton compacting process.

BACKGROUND ART

Cotton harvesting machines having an on-board cotton module building capability, also known as a cotton packager, include a cotton compacting chamber in which the compacted cotton module is built, formed by a floor and upstanding walls. Supported within this cotton compacting chamber is cotton compactor apparatus supported for vertical upward and downward movement for compacting cotton received in the chamber into the lower region thereof, for forming the module. It is important for the thus formed cotton module to have a cohesive, unitary composition which will be free standing when unloaded from the cotton compacting chamber, and which will remain substantially intact when subsequently handled. In particular, it is desirable for the upstanding sides of the thus formed compacted cotton module to be firm and relatively smooth to facilitate the subsequent handling, and also the removal of the module from the compacting chamber.

As a result, it is desirable for the structure and driving apparatus supporting the compactor apparatus to be located outwardly or outside of the compacting chamber. Such support structure and driver apparatus could be located above the compactor apparatus. However, the overall height of cotton harvesting machines must be limited so as to be able to pass through storage building doorways and under bridges, utility lines, and other overhead obstructions when moving from field to field. Therefore, it is sought to provide support structure and actuating drivers outside of the side walls of the compacting chamber.

Reference in this regard, U.S. Pat. Nos. 6,530,199 and 6,536,197, wherein driver apparatus for the movement of the compactor structure or apparatus include four fluid cylinders, arranged two on each side of the compacting chamber. Such cylinders are disclosed as being double cylinders, one of which is used to index the compactor apparatus upwardly as the height of the module is increased, and the other for moving the compactor apparatus downwardly from the indexed location against the cotton in the compacting chamber for compacting the cotton. However, one disadvantage of such an arrangement is the cost of such a large number of cylinders. Another problem is that since the compactor apparatus is movable upwardly and downwardly and is supported only by the rods of the cylinders, its vertical movement and position is dictated by the extending and contracting of the cylinder rods, resulting in movement which is not always even. This can be the result of numerous conditions, including that the hydraulic fluid does not reach the cylinders simultaneously such that even vertical movement does not take place. This results in cotton modules which are uneven in height front-to-rear or side-to-side, or both.

Thus, what is sought is support and driver apparatus for cotton compactor apparatus for a module builder, which overcomes one or more of the disadvantages and problems set forth above.

SUMMARY OF THE INVENTION

What is disclosed is structure for supporting compactor apparatus and drivers for the compactor apparatus which overcomes one or more of the disadvantages and problems set forth above.

According to a preferred embodiment of the invention, the compactor apparatus includes a frame to be disposed within the cotton compacting chamber of a cotton module builder or packager including one or more structural elements which are movable downwardly within the chamber against the cotton for compacting the cotton against the floor and walls of the chamber. The frame includes cross members, preferably at the front and rear ends of the chamber which extend across the chamber and protrude outwardly therefrom through upwardly and downwardly extending slots or passages through the side walls defining the chamber. The ends of the cross members which protrude through the slots or passages on each side of the chamber are connected together by an exterior side structure so as to be jointly movable upwardly and downwardly within the slots or passages, such that the frame is correspondingly moved upwardly and downwardly within the interior of the compacting chamber. Importantly, to maintain the frame at a horizontal orientation within the compacting chamber, or at an orientation relative to the floor within a permissible range, the exterior side structure on each side of the compacting chamber is guided by at least one vertically extending guide member. The side structure and at least one guide member can include members cooperatively engageable during the movement of the side structure such as rollers or the like. The exterior side structure on each side of the compacting chamber is connected to the module builder by a suitable driver, such as a fluid cylinder or the like, for moving the exterior side structure, and the frame upwardly and downwardly as desired or required for compacting the cotton within the chamber.

The frame of the compactor apparatus located within the compacting chamber preferably includes, in addition to the structural elements for compacting the cotton, at least one cotton driver, such as an auger or the like, extending in a horizontal orientation, and actuatable for moving the cotton within the chamber for more evenly distributing it therein, for forming a more even cotton module.

DETAILED DESCRIPTION OF THE INVENTION

Figure 1:
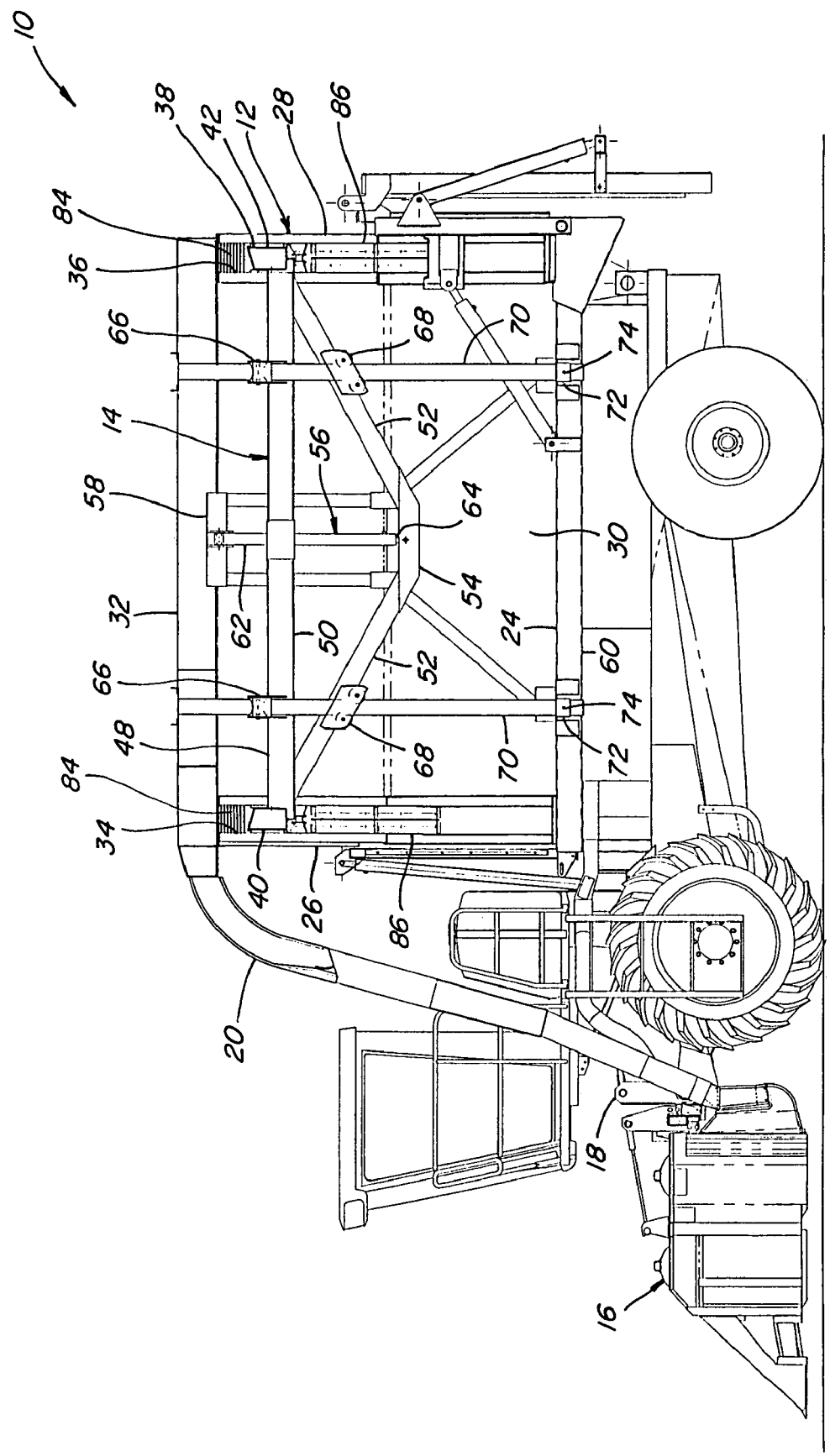
FIG. 1 is a side view of a cotton harvesting machine having an on-board cotton module builder including compactor apparatus according to the present invention thereon.

Referring now to the drawings, in FIGS. 1, 2, 3 and 4, a cotton harvesting machine 10 is shown, including an on-board cotton module builder 12, including compactor apparatus 14 constructed and operable according to the teachings of the present invention. Generally, cotton harvesting machine 10 is self-propelled for movement over a field of cotton plants, and includes a plurality of cotton harvesting units 16 extending in a side-by-side array across a front end 18 of machine 10. Cotton harvested by harvesting units 16 is conveyed by flows of air through ducts 20 which extend rearwardly and upwardly from harvesting units 16 to an upper region of a cotton compacting chamber 22 of module builder 12, in the well known conventional manner. The cotton conveyed into cotton compacting chamber 22 will then collect on a floor 24 within chamber 22, against which the cotton will be compacted by compactor apparatus 14, as will be explained.

Cotton compacting chamber 22 is a four-sided cavity defined on the bottom by floor 24 and upwardly extending opposing front and rear end walls 26 and 28, and side walls, represented by side wall 30, extending therebetween. Walls 26, 28 and 30 typically include openings or perforations therethrough, to allow passage and dissipation of the air used to convey the cotton into chamber 22, while retaining the cotton therein. The upper region of cotton compacting chamber 22 of module builder 12 is enclosed by a roof 32 which can also include openings or perforations for the passage of air but not cotton therethrough. Importantly, the side walls, as represented by side wall 30, each include a vertical forward slot 34 adjacent front end wall 26, and a vertical rearward slot 36 adjacent rear end wall 28, slots 34 and 36 extending substantially the entire vertical height of the compacting chamber.

Figure 4:
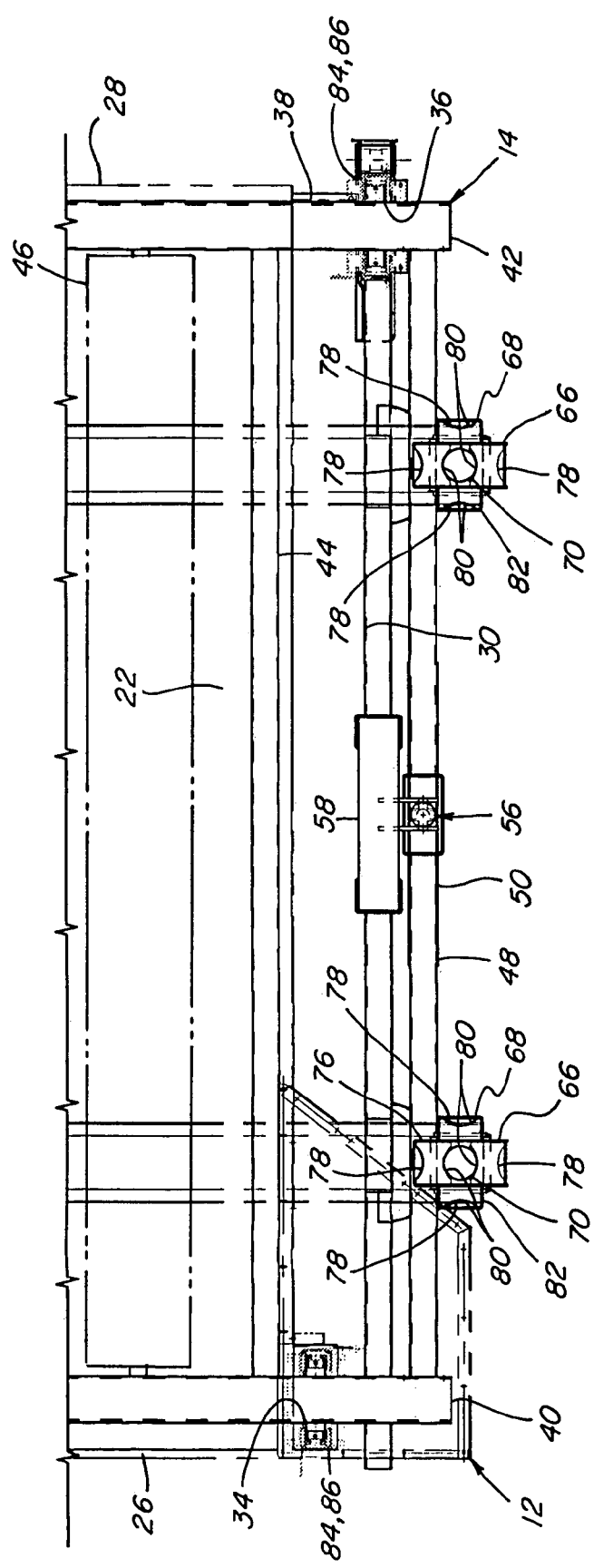
FIG. 4 is an enlarged fragmentary top view of the module builder and compactor apparatus.

Referring also to FIG. 4, compactor apparatus 14 of module builder 12 includes a compactor frame 38 which is generally horizontal and substantially entirely disposed within cotton compacting chamber 22, for movement downwardly against cotton contained therein for compacting the cotton against floor 24. Compactor frame 38 includes a front cross member 40 disposed in chamber 22 adjacent front end wall 26, and having opposite ends which extend through slots 34. Similarly, a rear cross member 42 is disposed in chamber 22 adjacent rear end wall 28 and has opposite ends extending through slots 36. A plurality of front and rear extending members 44 extend between and connect front and rear cross members 40 and 42. Additionally, preferably at least one, and most preferably, several augers 46 are supported for rotation on front and rear cross members 40 and 42, and extend forwardly and rearwardly therebetween. Augers 46 can be rotated using any suitable commercially available drivers, such as a gear drive driven by a motor such as a fluid or electric motor, or directly by fluid or electric motors, as desired, for distributing the collected cotton in chamber 22 as required or desired. In this regard, it is particularly desirable to distribute the cotton evenly with respect to the plane of floor 24, such that the resultant compacted cotton module will have a substantially uniform height along its length and width.

Compactor frame 38 of compactor apparatus 14 is supported in compacting chamber 22 on each side by an exterior side structure 48, each structure 48 including a substantially horizontal, forwardly and rearwardly extending main beam 50 which extends between and connects front and rear cross members 40 and 42. Each side structure 48 additionally includes a pair of braces 52 which extend downwardly and at converging angles from front and rear cross members 40 and 42, and which are connected together by a gusset 54 located spacedly below about the middle of main beam 50. Here, it should be noted that compactor frame 38 located within compacting chamber 22 and exterior side structures 48 on the exterior of the side walls represented by side wall 30 are movable upwardly and downwardly together.

The upward and downward movement of exterior side structures 48 and compactor frame 38 is preferably achieved and controlled by drivers 56 extending, respectively, between gusset 54 of each exterior side structure 48 and a support frame 58 supported by and extending upwardly from a frame 60 of module builder 12. Drivers 56 each preferably comprise a fluid cylinder which receives fluid under pressure from a suitable pressurized fluid source, such as a fluid pump of machine 10, for moving exterior side structure 48, and thus compactor frame 38 of compactor apparatus 14, upwardly and downwardly as required or desired for performing a cotton distributing and/or compacting operation. Each driver 56 includes a fluid cylinder 62 connected to support frame 58 and a rod 64 connected to gusset 54 of exterior side structure 48.

Figure 2:
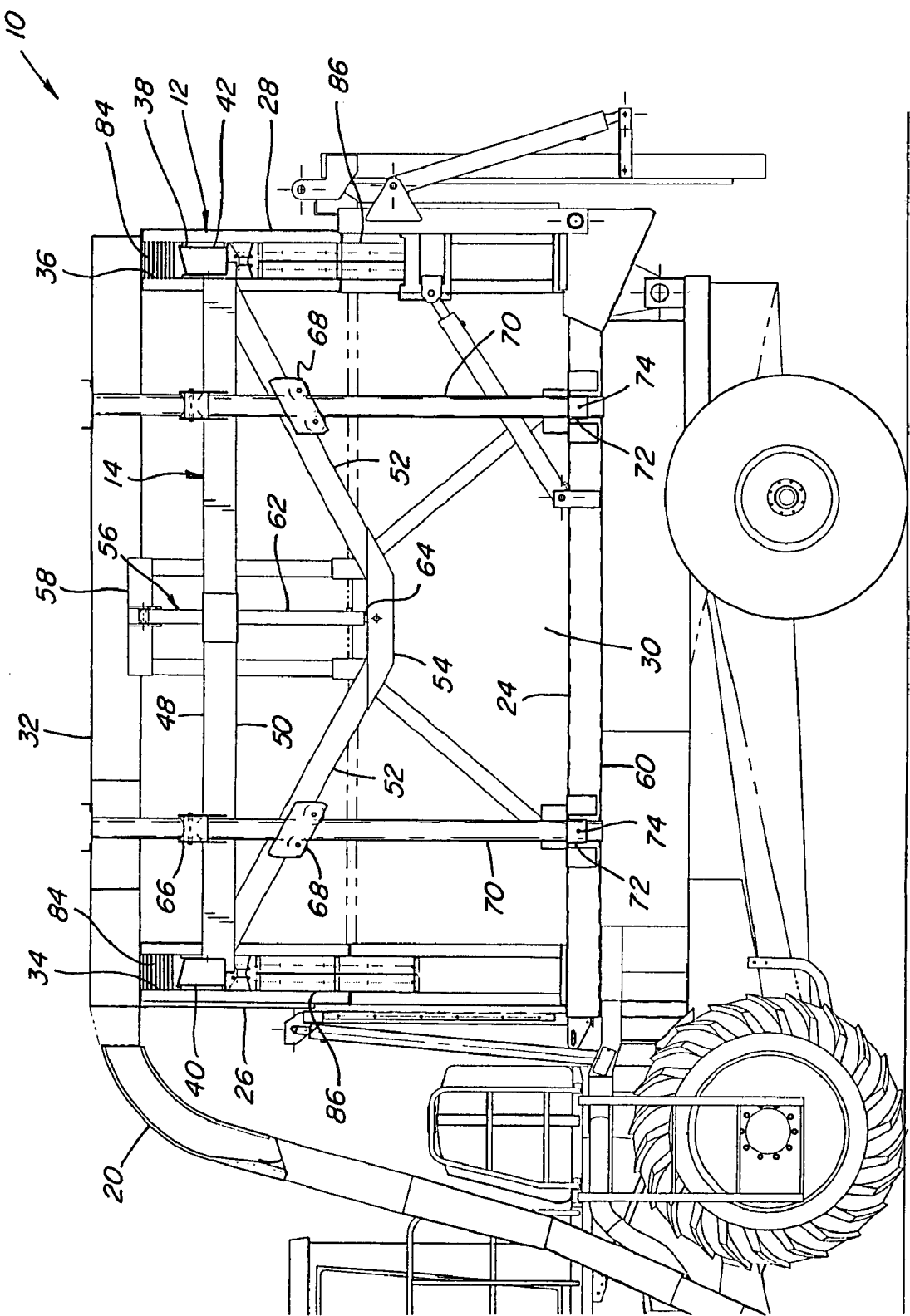
FIG. 2 is an enlarged fragmentary side view of the harvesting machine of FIG. 1 showing the compactor apparatus of the invention in an uppermost position.
Figure 3:
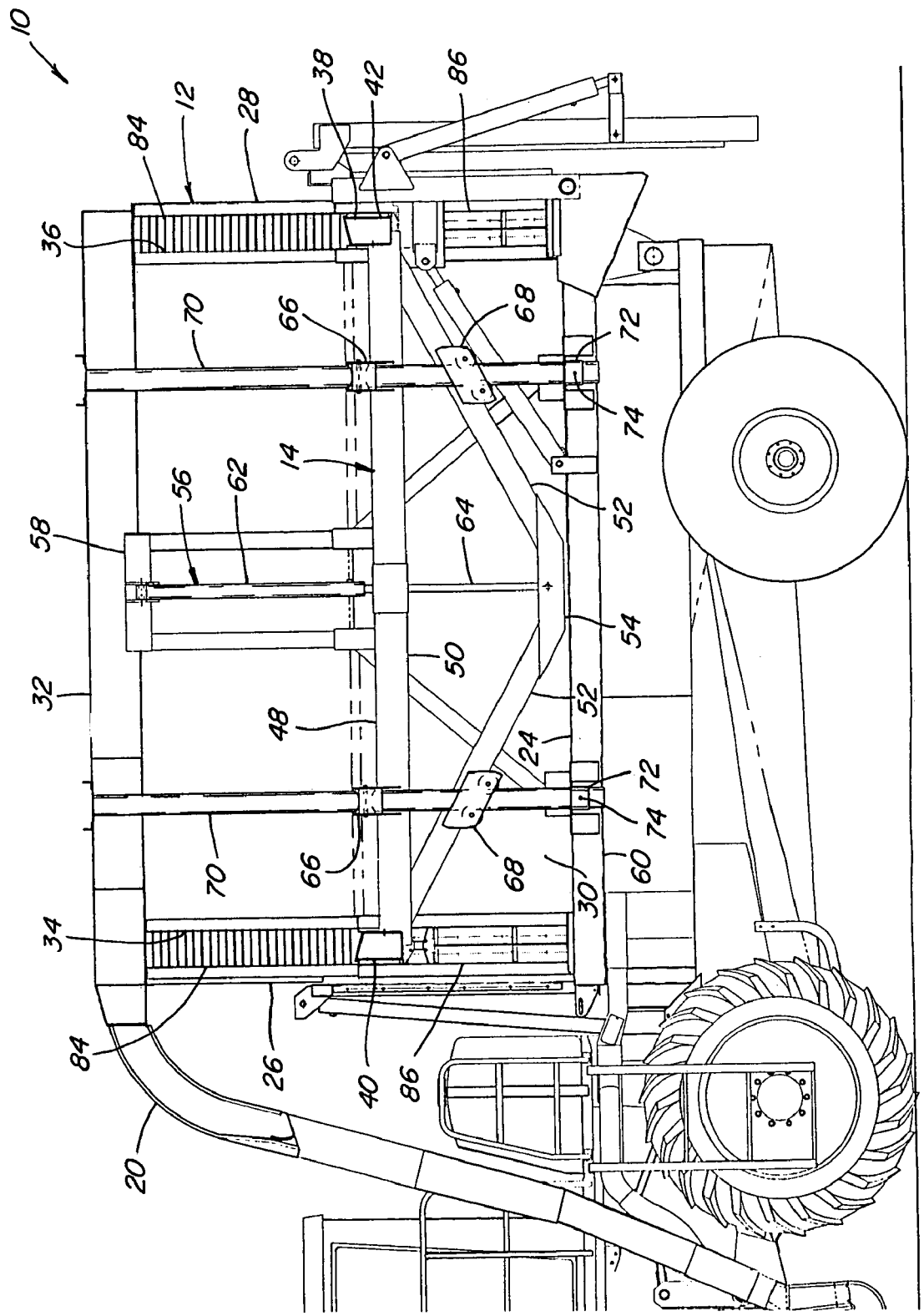
FIG. 3 is another enlarged fragmentary side view of the harvesting machine of FIG. 1 showing the compactor apparatus in a lowered, compacting position.

In FIGS. 1 and 2, rod 64 is shown in a retracted position in cylinder 62 such that exterior side structure 48 and compactor frame 38 are located at an elevated position. FIG. 3 shows rod 64 extended to a substantially extended position, to position side structure 48 and compactor frame 38 at a lowered position, representing a maximum compacting position of compactor apparatus 14.

Figure 5:
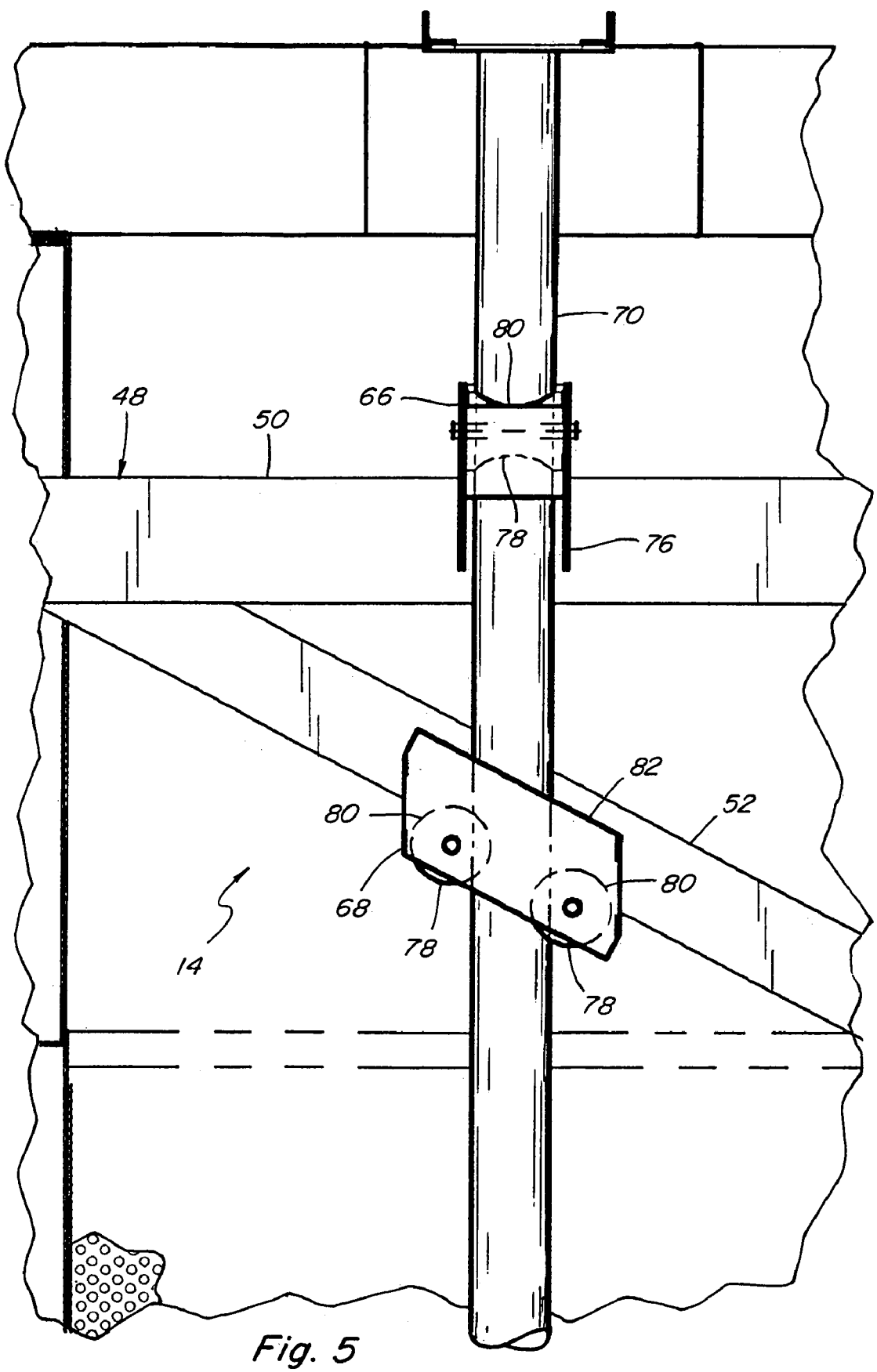
FIG. 5 is still another enlarged fragmentary side view of the module builder and exterior side structure and a guide member of the apparatus, showing rollers for controlling and guiding movement of the side structure along the guide member.

Referring also to FIG. 5, as noted above, it is a sought after feature of the present module builder 12 to form and produce complete cotton modules having a substantially uniform height over the front-to-rear and side-to-side extent thereof. Generally, the harvested cotton conveyed through ducts 20 into compacting chamber 22 will have a tendency to collect in the more rearward region of chamber 22, such that distribution in a forward direction by augers 46 is typically required. However, the cotton, even though more evenly distributed within chamber 22, can have various inconsistencies in density and other conditions which make various regions of the collected cotton more difficult or easy to compact relative to other regions. As a result, if the downward movement of compactor frame 38 is not restrained or controlled, compactor frame 38 can be tilted undesirably and lateral loads and stresses can be exerted against driver 56, both in the forwardly and rearwardly, and side-to-side directions.

To limit lateral loading, and facilitate the even distribution and compaction of the cotton within cotton compacting chamber 22 by compactor apparatus 14, each exterior side structure 48 includes upper guide roller assemblies 66, and lower guide roller assemblies 68 which rollingly engage and are movable upwardly and downwardly along vertical guide members 70 disposed at spaced locations adjacent each side of module builder 12, for controllably guiding the upward and downward movement of side structures 48 and compactor frame 38, for holding or maintaining compactor frame 38 in a substantial horizontal orientation as it compacts the cotton in chamber 22. Guide members 70 are fixedly mounted to frame 60 by brackets 72 which comprise sleeves which receive the respective guide members 70 and hold them in upstanding position and orientation beside module builder 12. Each guide member 72 is preferably maintained in such upstanding orientation and position in bracket 72 by a pin 74, which can be removed to allow lowering guide members 70 with upper portions of module builder 12, for reducing the overall height of machine 10 for transport on trucks and rail cars, and other purposes as desired or required.

Each upper guide roller assembly 66 includes a bracket 76 mounted to main beam 50 of exterior side structure 48 and is of bifurcated or U-shaped construction so as to receive a guide member 70 therethrough. Bracket 76 supports a pair of rollers 78 for rotation about forwardly and rearwardly extending axes on opposite sides of guide member 70, for controlling or substantially limiting side-to-side movement of exterior side structure 48, and thus compactor frame 38. To facilitate contact between rollers 78 and guide member 70, rollers 78 each preferably has a concave outer surface 80 which engages the guide member 70.

Similarly, each lower guide roller assembly 68 includes a bracket mounted to brace 52 of exterior side structure 48 and is of bifurcated or U-shape construction so as to receive a guide member 70 therethrough. Bracket 82 supports a pair of rollers 78 for rotation about side-to-side extending axis on opposite sides of guide member 70, for controlling or substantially limiting forward and rearward movement of exterior side structure 48, and thus compactor frame 38. To facilitate contact between rollers 78 and guide member 70, rollers 78 each preferably has a concave outer surface 80 which engages the guide member 70.

Figure 6:
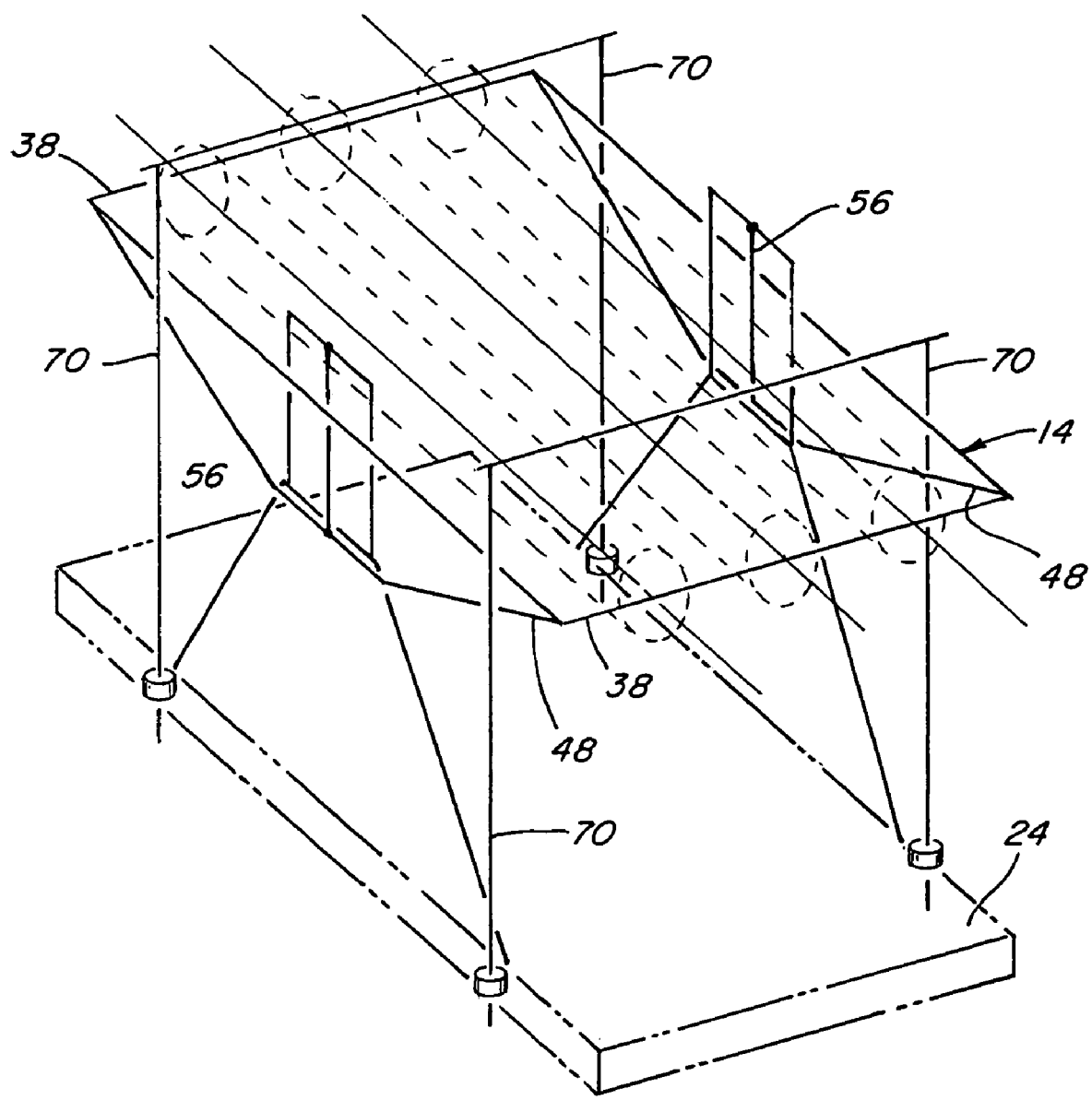
FIG. 6 is a simplified schematic perspective representation of the compactor apparatus of the invention in a raised position.

Referring to FIG. 6, a schematic representation of compactor apparatus 14 in a raised position above floor 24 is shown. Here, drivers 56 can be observed supporting exterior side structures 48 on opposite sides of compactor frame 38, and the positions of guide members 70 relative to exterior side structures 48 is evident.

Figure 7:
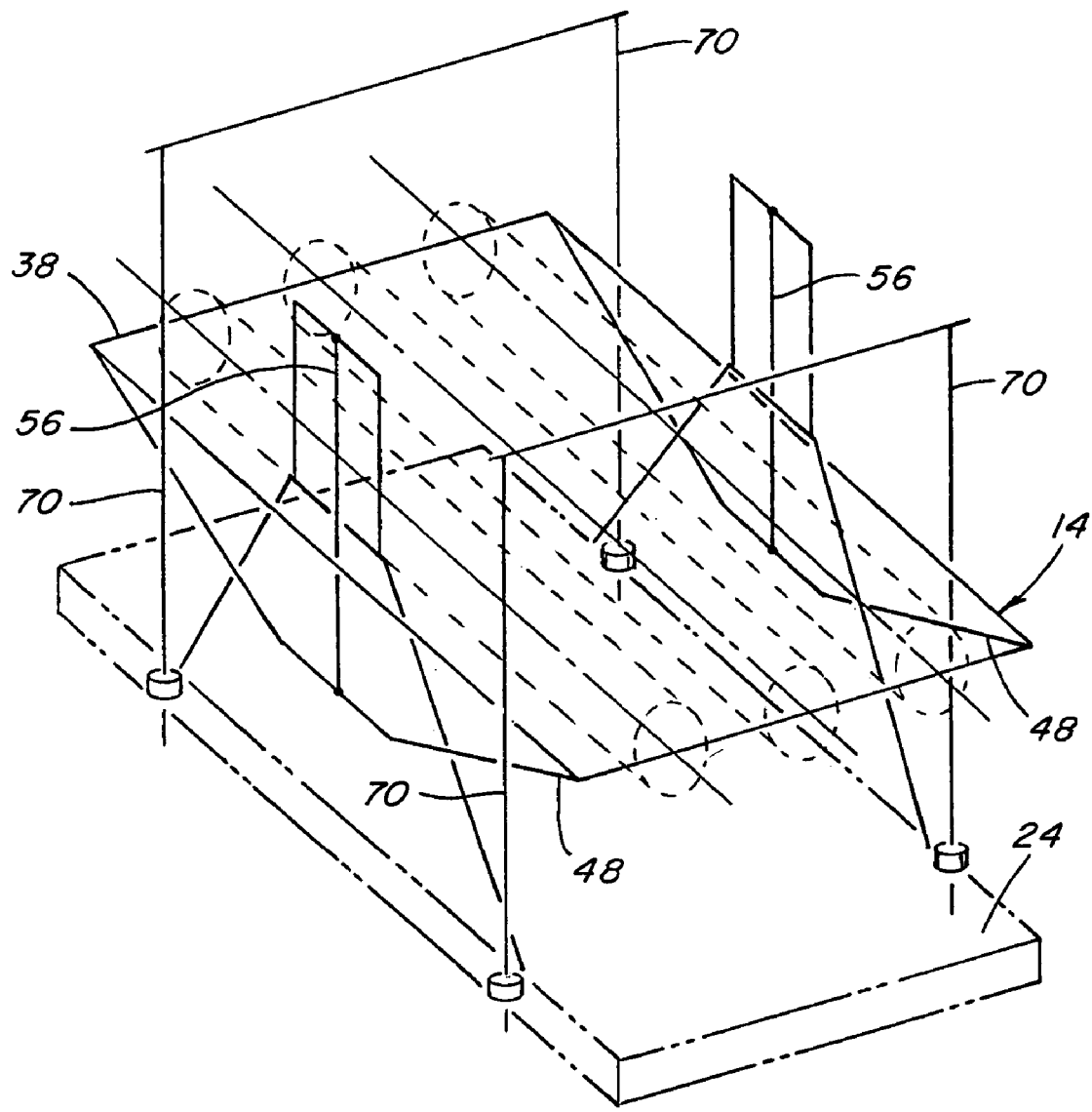
FIG. 7 is another simplified schematic perspective representation of the compactor apparatus of the invention in a lowered position.

FIG. 7 is a schematic representation showing compactor apparatus 14 in a lowered, compacting position, with compactor frame 38 supported by drivers 56 and exterior side structures 48. Again, the position of guide members 70 adjacent exterior side structures 48 is evident.

Referring again to FIGS. 1, 2, 3 and 4, to contain the cotton and prevent passage through and compacting of cotton in slots 34 and 36, each slot 34 and 36 includes an upper bellows 84 which encloses the slot above cross member 40 or 42, and a lower bellows 86 which encloses the slot beneath the cross member 40 or 42. Bellows 84 and 86 include elements movable with the respective cross member 40 and 42, and retractable and extendible elements for varying the height of the bellows during the movement of the cross member. Lower bellows 86 include an interior surface which faces compacting chamber 22 which is of substantially rigid construction, to prevent the forces of compaction from forcing the cotton into the slot.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An on-board cotton module builder for a cotton harvesting machine, comprising:
module builder structure including a floor and walls extending upwardly from opposite peripheral edges of the floor, defining a cotton compacting chamber; and
compactor apparatus disposed within the cotton compacting chamber, including a compactor frame having cross members extending across the chamber, each of the cross members having opposite ends which extend through upwardly and downwardly extending passages through the walls, respectively, the ends extending through each of the walls being connected together by side structures located externally of the compacting chamber, single drivers located externally of each of the walls in connection with the side structures, respectively, the drivers being controllably operable for simultaneously moving the side structures upwardly and downwardly relative to the walls to move the cross members upwardly and downwardly through the passages and the frame upwardly and downwardly within the compacting chamber, the frame including at least one compactor member extending through the chamber supported by the cross members for compacting cotton in the chamber against the floor when the frame is moved downwardly, at least one upwardly and downwardly extending guide member disposed vertically adjacent to each of the walls and cooperatively engaged with the side structures, respectively, for guiding upward and downward movement of the side structures and the frame, the guide members positioned outside of the compacting chamber, and elements for preventing passage of cotton through the passages, said elements are disposed above and below the ends of the cross members in the upwardly and downwardly extending passages through the walls.

2. The cotton module builder of claim 1, wherein each of the drivers comprises a fluid cylinder connected between the side structure and the module builder structure.

3. The cotton module builder of claim 1, wherein each of the side structures includes at least one guide roller assembly including at least one roller rollable upwardly and downwardly along the at least one guide member for guiding the upward and downward movement of the side structure.

4. The cotton module builder of claim 3, wherein each of the guide roller assemblies includes pairs of opposing rollers supported so as to be rollable along angularly related surfaces of the guide member.

5. The cotton module builder of claim 3, wherein each of the guide members has a cylindrical outer surface and each of the rollers of the assembly includes a concave cylindrical surface rollingly engaged with the cylindrical outer surface.

6. The cotton module builder of claim 1, wherein the upwardly and downwardly extending passages through the walls are located adjacent to ends of the walls, the single drivers are located externally of each of the walls about equidistant between the passages therethrough, and the at least one upwardly and downwardly extending guide member disposed adjacent to each of the walls includes two of the guide members located between the passages and the driver, respectively.

7. The cotton module builder of claim 1, wherein each of the side structures includes a pair of guide roller assemblies, including angularly related rollers movable upwardly and downwardly along the at least one guide member.

8. The cotton module builder of claim 1, wherein the guide members guide the upward and downward movement of the side structures such that the frame is held at least generally parallel to the floor during the movement.

9. The cotton module builder of claim 1, wherein the elements for preventing passage of cotton through the passages comprise bellows.

10. A cotton module builder for a cotton harvesting machine, comprising:

module builder structure including a floor and opposing side walls extending upwardly from opposite peripheral edges of the floor defining a cotton compacting chamber, the chamber being enclosed at one end by an upwardly extending end wall and at an opposite end by a door, and the opposing side walls having upwardly and downwardly extending opposing slots therethrough adjacent to the opposite ends of the chamber; and compactor apparatus disposed within the cotton compacting chamber, the compactor apparatus including a compactor frame having cross members, each of the cross members extending sidewardly across the chamber and including ends extending through the opposing slots through the opposing side walls, respectively, the cross members supporting at least one compactor member extending therebetween, the ends of the cross members extending through the slots through each of the side walls being connected to a side structure supported adjacent thereto by a single driver, the side structures positioned externally of the compacting chamber the drivers supporting the side structures being controllably operable for simultaneously moving the side structures upwardly and downwardly relative to the walls to move the cross members upwardly and downwardly through the slots and the frame upwardly and downwardly within the compacting chamber, at least one upwardly and downwardly extending guide member disposed vertically adjacent to each of the side walls external to the compacting chamber and cooperatively engaged with the side structures, respectively, for guiding upward and downward movement of the side structures and the frame, the guide members positioned outside of the compacting chamber, and elements for preventing passage of cotton through the slots disposed in the upwardly and downwardly extending slots through the side walls.

11. The cotton module builder of claim 10, wherein each of the drivers comprises a fluid cylinder connected between the side structure and the module builder structure.

12. The cotton module builder of claim 10, wherein each of the side structures includes at least one guide roller assembly including at least one roller rollable upwardly and downwardly along the at least one guide member for guiding the upward and downward movement of the side structure.

13. The cotton module builder of claim 12, wherein each of the guide roller assemblies includes pairs of opposing rollers supported so as to be rollable along angularly related surfaces of the guide member.

14. The cotton module builder of claim 12, wherein each of the guide members has a cylindrical outer surface and each of the rollers of the assembly includes a concave cylindrical surface adapted to roll along the cylindrical outer surface.

15. The cotton module builder of claim 10, wherein the elements for preventing passage of cotton through the slots comprise bellows.

16. The cotton module builder of claim 10, wherein each of the side structures includes a pair of guide roller assemblies including angularly related rollers movable upwardly and downwardly along the at least one guide member.

17. The cotton module builder of claim 10, wherein the guide members guide the upward and downward movement of the side structures such that the frame is held at least generally parallel to the floor during the movement.

* * * * *